Figure 1:
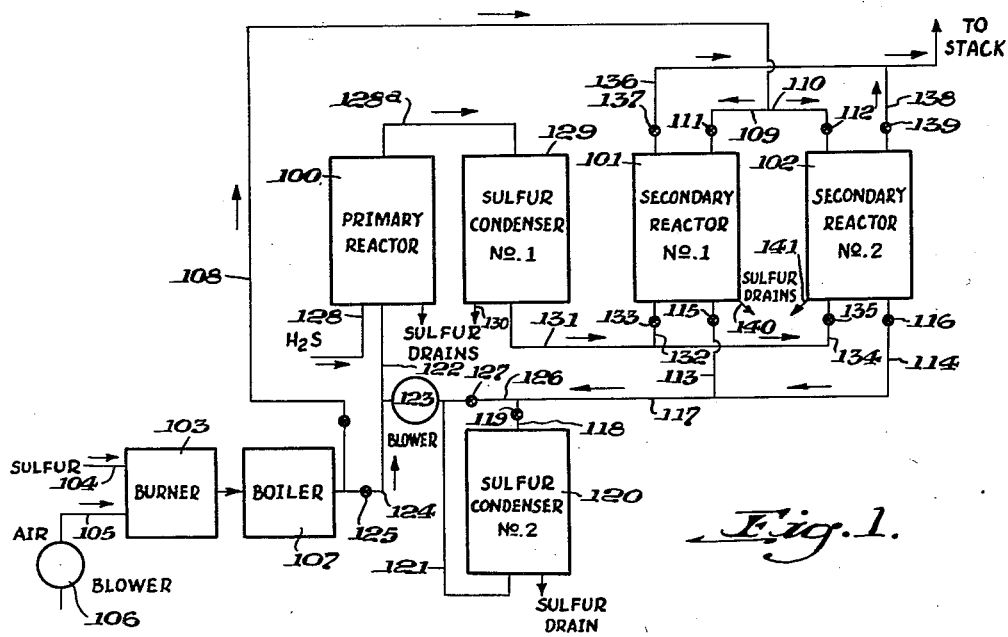

Oct. 16, 1956 W. W. DUECKER 2,767,062
METHOD FOR PRODUCING SULFUR
Filed Feb. 7, 1951 3 Sheets-Sheet 1

INVENTOR.
WERNER W. DUECKER.
BY
his ATTORNEYS.

INVENTOR.
WERNER W. DUECKER.
BY
his ATTORNEYS

Oct. 16, 1956  W. W. DUECKER  2,767,062
METHOD FOR PRODUCING SULFUR
Filed Feb. 7, 1951  3 Sheets-Sheet 3

INVENTOR.
WERNER W. DUECKER
BY
his ATTORNEYS.

United States Patent Office 2,767,062
Patented Oct. 16, 1956

2,767,062

METHOD FOR PRODUCING SULFUR

Werner W. Duecker, Pelham, N. Y., assignor to Texas Gulf Sulphur Company, New York, N. Y., a corporation of Texas Application February 7, 1951, Serial No. 209,877

3 Claims. (Cl. 23—226)

This invention relates to the production of sulfur from hydrogen sulfide, and it is particularly applicable to the production of sulfur from the hydrogen sulfide carried in sour natural gas.

The primary object of the invention is to produce sulfur substantially quantitatively and inexpensively, employing simple apparatus and manipulations, from hydrogen sulfide ($H_2S$) and sulfur dioxide ($SO_2$).

A further object is to produce sulfur from $H_2S$ and $SO_2$ by operation at lower temperatures than have been proposed heretofore, with attendant operating and economic advantages.

Yet another object is to provide a process of producing sulfur from $H_2S$ and $SO_2$ that embodies the aims of the foregoing objects and is cyclic, whereby to effect substantially continuous efficiency of sulfur yield.

Another object is to provide a process in accordance with the objects stated above that is applicable to catalyst fluidizing principles.

Other objects will be understood from the following description and claims.

In carrying out the invention, sulfur is produced from hydrogen sulfide by reacting it with sulfur dioxide in the presence of a catalyst. This reaction produces sulfur and water. This reaction has been proposed heretofore but the idea has been to carry out the reaction at temperatures above the dew point of sulfur so that the sulfur produced would not condense on the catalyst and thus eventually render it ineffective. In other words, under such proposals sulfur has been produced in the vapor phase under the prevailing temperature and pressure conditions. In operating at temperatures above the dew point, the conversion to sulfur is not complete. I have discovered, and it is upon this that this invention is in part predicated, that by effecting the reaction at temperatures below the dew point of sulfur, preferably at 150° C. or less, whereby the sulfur produced is not in the vapor phase, substantially quantitative production of sulfur is obtained. The sulfur produced is formed and directly deposited on the catalyst and may be easily recovered therefrom, thereby regenerating the catalyst for further reaction of $H_2S$ and $SO_2$. When these temperatures are employed and when the catalyst is used to receive the deposit of the sulfur, it is a simple matter to carry out the recovery in a continuous cyclic operation which is most efficient and inexpensive. Likewise, in this way the invention is applicable to fluidizing practice with attendant benefit.

Figure 2:
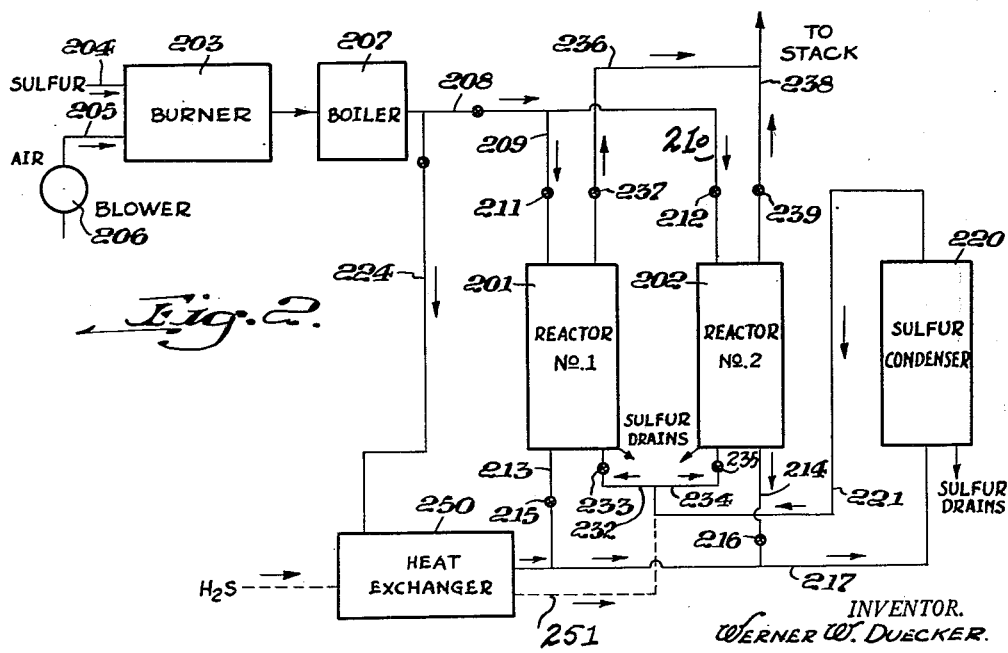
Figure 3:
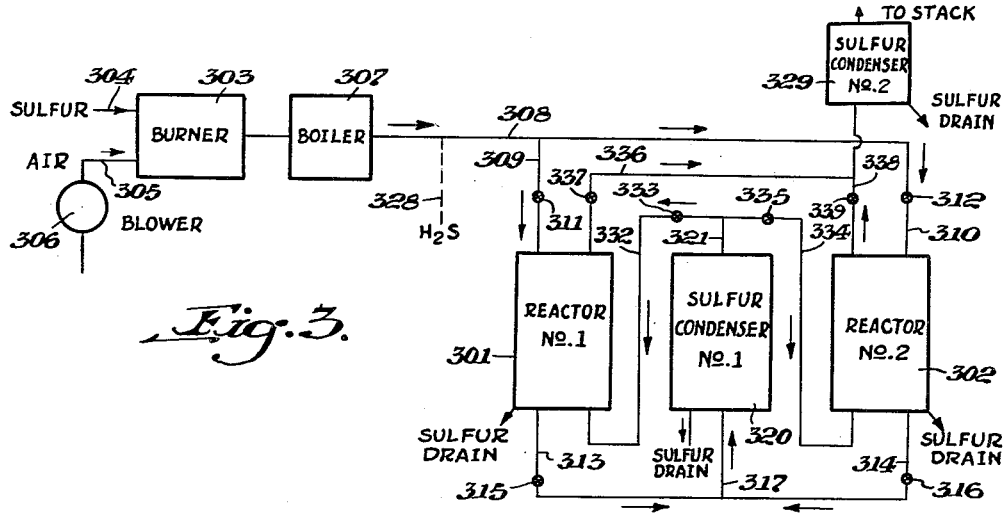
Figure 4:
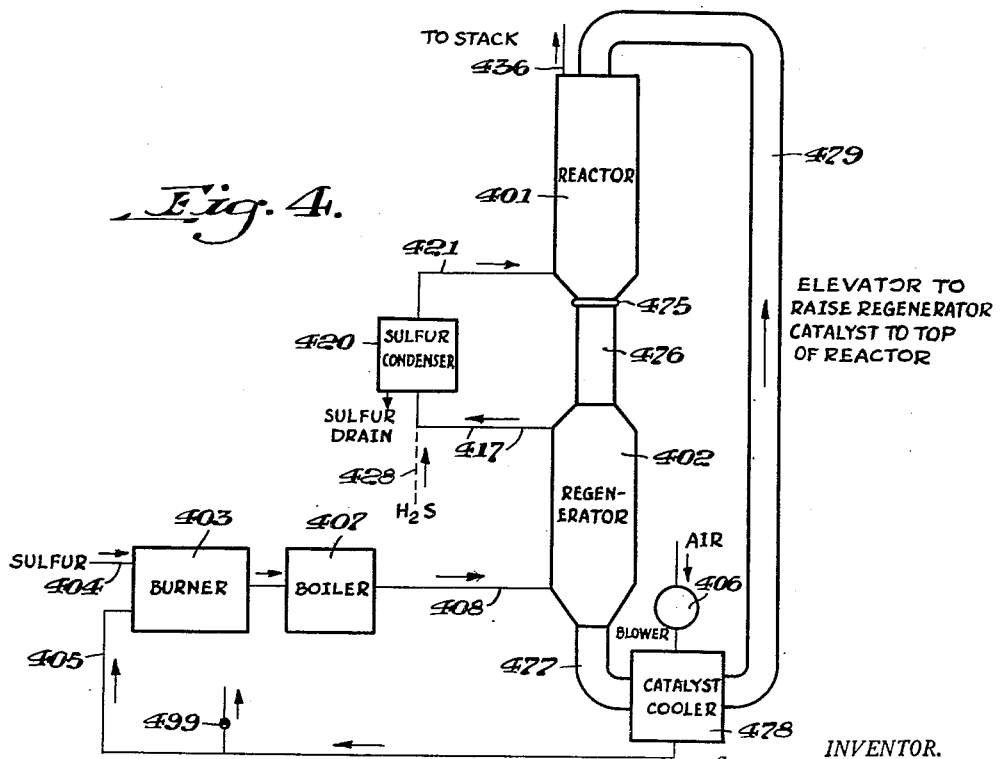
Figure 5:
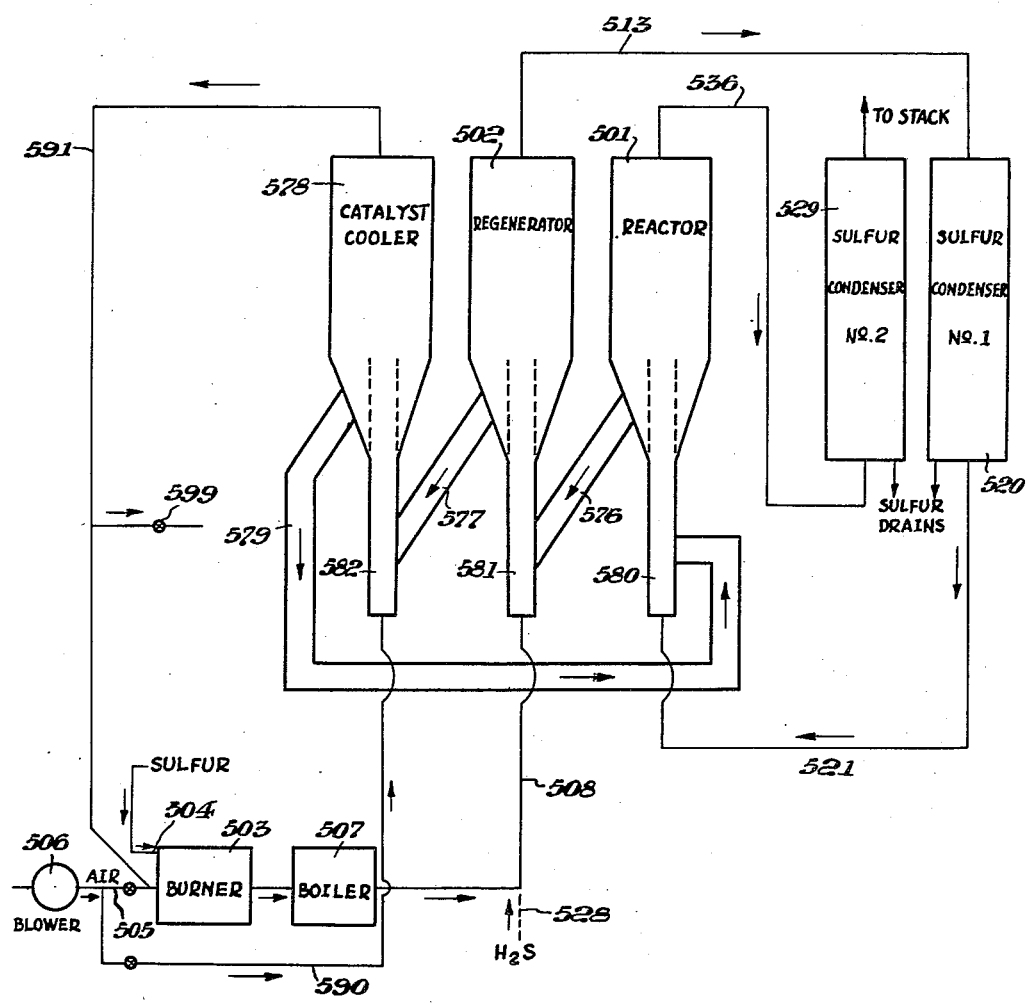

The objects of this invention are attained by the apparatus illustrated in the accompanying drawings in which: Fig. 1 is a diagrammatic representation of apparatus for carrying out the invention using a pair of chambers which serve alternately as reactors and regenerators; Fig. 2 is a diagrammatic representation of a different form of apparatus using a pair of chambers; Fig. 3 is a diagrammatic representation of a still different form of apparatus using a pair of chambers for practicing the invention; Fig. 4 is a diagrammatic representation of a still different form of apparatus for carrying out the invention in which the catalyst is cycled from reactor through a regenerator; and Fig. 5 is a diagrammatic representation of further different apparatus for carrying out the invention in which the catalyst is fluidized and flows cyclically from reactor to regenerator to cooler and thence back to reactor.

In carrying out the invention the sulfur dioxide may be supplied from any convenient and economical source. For example, sulfur may be burned to sulfur dioxide in a conventional type of sulfur burner. The sulfur dioxide, whatever its source, is passed with hydrogen sulfide to the converter where it contacts the catalyst. The temperature in the converter is maintained below the dew point of sulfur so that as the reaction proceeds the sulfur produced by the reaction is deposited on the catalyst. The catalyst body is preferably maintained below 150° C. since at this temperature the conversion is practically complete, as will appear.

When the deposit of sulfur has reached the point where the efficiency of the catalyst becomes economically undesirable, the deposited sulfur is removed, to regenerate the catalyst body for further reaction of $H_2S$ and $SO_2$. This may be accomplished in various ways. Preferably, however, a gas inert to sulfur is passed through the catalyst body at a temperature at which the sulfur is volatilized and carried away in the gas stream from which the entrained sulfur vapor is condensed in any suitable manner. Most suitably sulfur dioxide is used for this purpose, and after condensation of the sulfur vapor it is passed with hydrogen sulfide to a body of regenerated catalyst for further production of sulfur. Volatilization of the deposited sulfur is preferably effected above the boiling point of sulfur although, as known, with sufficient gas volume and velocity the sulfur can be removed from the catalyst at lower temperatures at which it has an appreciable vapor pressure.

In carrying out the process, the sulfur dioxide may be mixed with the hydrogen sulfide either before or after the catalyst regeneration step. If it is mixed before the regeneration step, the combined gases passing to the regenerator are maintained at temperatures at which they will volatilize the sulfur. The gases are, however, then cooled so that the reaction in the reactor will be below the dew point of sulfur.

The catalyst may be alumina or bauxite catalyst and may be of the activated type. Catalyst sized through a 2 mesh sieve and on a 4 mesh sieve is highly satisfactory. Compressed alumina cylinders or tablets of ⅛ inch diameter have likewise been found to be highly satisfactory. Various other catalysts have operated satisfactorily also such, for example, as twelve different brands of firebrick, Leviathan ore No. 1, silica gel, activated charcoal, Pyrex glass wool, bone char, fuller's earth, Lenander catalyst and Lenander type catalysts in which Portland cement was replaced by various commercial high temperature cements, MgO on silica gel. Glass, silica and quartz are among the other catalysts that may be used. All of these, it will be seen, are chemically non-reactive in this use so that it appears that they act as simple inert contact catalysts.

If the reaction is carried out at 150° C. or below, 99% conversion takes place. If the temperature is raised to 200° C., 97.5% conversion is effected. If the reaction temperature is raised to 250° C., 93.5% conversion is effected. In other words, the percentage conversion decreases above the dew point, and progressively as the temperature approaches 500° C.

In carrying out the process, two stationary beds of catalyst may be employed alternately. If this is done, one bed is used as a reactor while the catalyst in the other is being regenerated.

The process may be carried out also with a moving-catalyst bed. The movement may be either intermittent or continuous. As the catalyst moves through the reactor the reaction takes place and the sulfur is deposited thereon. The catalyst then moves to a regenerator zone where the sulfur is removed. Thereafter the regenerated catalyst is cooled and returned to the reactor.

A continuous cyclical process may be carried out by fluidizing finely-powdered catalyst by means of the gases involved. When the process is carried on in this manner the catalyst fluidized by hydrogen sulfide and sulfur dioxide passes through the reactor where the sulfur is deposited on it. The fluidized catalyst is passed to the regenerator where it is fluidized by the gases which remove the sulfur. Still fluidized the catalyst is cooled and passes to the reactor in its regenerated state.

In carrying out the process, two mols equivalent of hydrogen sulfide and one mol equivalent of sulfur dioxide are required for complete conversion. Hence, in preferred practice those proportions are used, and sulfur is burned to produce the requisite amount of sulfur dioxide.

Having reference now to Fig. 1, the process is carried out in a primary reactor 100 and in two alternately used secondary reactors 101 and 102. These reactors are closed chambers, each having therein finely-divided alumina catalyst. Sulfur is introduced into a burner 103 through a conduit 104. Air is supplied to the burner 105 by a blower 106. The sulfur dioxide and the combustion gases from the burner 103 are passed to a boiler 107 where some of the heat is extracted.

Hot sulfur dioxide is led from the boiler 107 through a conduit 108 for the purpose of regenerating the catalyst in either reactor 101 or 102 by volatilizing sulfur deposited in the reactor through which the gas flows.

Conduit 108 leads to a pair of conduits 109 and 110 which are controlled respectively by valves 111 and 112. Sulfur dioxide carrying the volatilized sulfur passes from the reactor through conduits 113 and 114 which are controlled respectively by valves 115 and 116. These conduits are connected to conduit 117 which leads through conduit 118 controlled by valve 119 to a sulfur condenser 120.

After removal of the sulfur in condenser 120 the sulfur dioxide is conducted through conduit 121 to a blower 123 which passes it to a conduit 122 connected to the primary reactor 100. A conduit 124 likewise leads to conduit 122 from the burner and is controlled by valve 125.

The sulfur dioxide from the secondary reactor may by-pass the sulfur condenser 120 and pass directly to blower 123 through conduit 126 which is controlled by valve 127.

Hydrogen sulfide is admitted to the primary reactor 100 through conduit 128.

In operation, sulfur dioxide is admitted either directly from the burner through conduit 124 or from the secondary reactors through conduit 121 to conduit 122 and thence to the primary reactor 100. It is there mixed with hydrogen sulfide and under the influence of the catalyst reacts partially to form sulfur and water. The temperature in the primary reactor is maintained above the dew point of the sulfur produced so that there is little if any deposit of sulfur. The preferred temperature is from 240° C. to 320° C.

The gases containing sulfur pass from the primary reactor 100 through conduit 128a to a sulfur condenser 129 which is provided with a sulfur drain 130. The sulfur is here condensed out of the gas which passes through a conduit 131 and may go either through conduit 132 which is controlled by valve 133 to the secondary reactor 101 or through conduit 134 which is controlled by valve 135 to reactor 102.

The temperature in the secondary reactors is maintained below the dew point of the sulfur produced therein by the reaction between the unreacted sulfur dioxide and hydrogen sulfide in the gases. The preferred temperature for the reaction is below 150° C. The sulfur is deposited on the catalyst in these secondary reactors. The gas is then led to the stack either through conduit 136 which is controlled by valve 137 or through conduit 138 which is controlled by valve 139.

Reactor 101 is provided with a sulfur drain 140 and reactor 102 is provided with a sulfur drain 141.

In practice, only one of the secondary reactors 101 or 102 is on flow at one time. In order to maintain the process as a continuous one while one of the secondary reactors is in use, the catalyst in the other is undergoing regeneration. Thus, when the gas is passing to reactor 101 through conduit 132, valves 111 and 115 are closed and valves 112 and 116 are opened so that the sulfur dioxide from conduit 108 which is used to regenerate the catalyst in reactor 102 flows through reactor 102. During this period, valves 135 and 139 are closed, and valves 133 and 137 are open.

The sulfur dioxide passes from reactor 102 through conduit 114 to conduit 117. Sulfur may be removed therefrom in condenser 120 before the sulfur dioxide passes to the primary reactor. It is permissible, however, to pass the sulfur laden sulfur dioxide directly to the primary reactor leaving to condenser 129 the task of removing the sulfur.

When the catalyst in reactor 101 has become loaded with sulfur, valves 137 and 133 are closed, and valves 111 and 115 are opened permitting the sulfur dioxide from conduit 108 to pass through reactor 101. At this time valves 112 and 116 are closed and valves 135 and 139 are opened so that the unreacted hydrogen sulfide and sulfur dioxide remaining in the gases coming from primary reactor 100 and condenser 129 may react in reactor 102 while the hot sulfur dioxide from conduit 108 is regenerating the catalyst in reactor 101.

In the apparatus shown in Fig. 2, the reaction all takes place at reduced temperature, namely, below the dew point of sulfur and preferably below 150° C. There are two alternately employed reactors 201 and 202. In the burner 203, sulfur introduced through conduit 204 and air introduced through conduit 205 by a blower 206 react to produce sulfur dioxide. Some of the heat is removed in boiler 207. The hot sulfur dioxide may pass through conduit 208 and thence through conduits 209 or 210, which are controlled respectively by valves 211 and 212, to reactors 201 and 202 for regenerating the catalyst in the reactors, which are regenerated alternately as in the case of Fig. 1.

Conduits 213 and 214 controlled respectively by valves 215 and 216 lead from the reactors to conduit 217 which leads to the sulfur condenser 220 from which a conduit 221 leads to either conduit 232 which is controlled by valve 233 or to conduit 234 which is controlled by valve 235 to either reactor 201 or reactor 202. Conduit 236 controlled by valve 237 and conduit 238 controlled by valve 239 lead from reactors 201 and 202, respectively, to the stack. Conduit 224 from conduit 208 leads to a heat exchanger 250 through which the hydrogen sulfide is conducted by conduit 251 to conduit 221.

In this embodiment assume that reactor 201 is on flow and that reactor 202 is being regenerated. Valves 211 and 215 will be closed and valves 233 and 237 open. Likewise, valves 212 and 216 are open, while valves 235 and 239 are closed. Then hot sulfur dioxide passes through conduit 208 to reactor 202 where sulfur is vaporized from the catalyst. The sulfur laden gas leaves via conduit 214 and is led through 217 to condenser 220. From the condenser the SO₂ passes through conduit 221 in which it meets H₂S from conduit 251, and the mixture passes through conduit 232 into the reactor 201 from which the residual gas and water vapor flow to the stack through conduit 236. During this stage reactor 201 is operated below the dew point of sulfur. When the amount of sulfur deposited on the catalyst in 201 necessitates it the valve conditions described above are reversed whereby reactor 202 is placed on flow for reaction and reactor 201 undergoes regeneration.

In the form of invention shown in Fig. 3, two reactors are likewise employed. One is operated at or above the dew point of sulfur to regenerate the catalyst while the other is operated at a low temperature, preferably at or above the melting point of sulfur but below the dew point, for reaction, as in the other embodiments. The sulfur condenses out in the low temperature reactor and renders the catalyst inactive. The flow is then reversed and the low temperature reactor becomes the high temperature reactor and the high temperature reactor becomes the low temperature reactor.

The reactors 301 and 302 have beds of finely-divided catalyst as above described. A quantity of sulfur equivalent to about one third of the available hydrogen sulfide is burned with air in burner 303 to produce sulfur dioxide. The sulfur is introduced to the burner through the conduit 304 and the air is introduced through the conduit 305 under pressure from blower 306. The gas is passed through the waste heat boiler 307 where it is cooled somewhat. It then passes through conduit 308 into which the hydrogen sulfide is introduced from conduit 328. Conduits 309 and 310 lead to the reactors 301 and 302 respectively. These conduits are controlled respectively by valves 311 and 312. Conduits 313 and 314 controlled respectively by valves 315 and 316 lead from the reactors 301 and 302, respectively, to a conduit 317 connected to a sulfur condenser 320. A conduit 321 leads from the sulfur condenser to conduits 332 and 334 which are controlled respectively by valves 333 and 335 and lead, respectively, to reactors 301 and 302. Conduits 336 and 338 controlled, respectively, by valves 337 and 339 lead through a sulfur condenser 329 to the stack from reactors 301 and 302, respectively.

In operation, the mixture of hot sulfur dioxide and hydrogen sulfide is passed directly to one of the reactors, thence to the sulfur condenser 320 and thence to the other reactor. In the first reactor, the temperature is above the dew point of sulfur and any sulfur which has been deposited on the catalyst in the previous stage of the cycle is removed. The preferred temperature is from 240° C. to 320° C. The temperature may vary and will be fixed by the rate at which it is desired to regenerate the catalyst in the chamber before switching over to the reverse operation. In the first reactor some of the hydrogen sulfide and sulfur dioxide react to produce sulfur and water.

When the gas bearing the sulfur produced by the reaction and removed from the catalyst in the first chamber passes to the condenser 320, the sulfur is removed and the gas is cooled to the desired temperature for the other reactor. The preferred temperature for the second reactor is below 150° C. but may vary up nearly to the dew point of the sulfur.

When the gas is introduced at the lower temperature into the second reactor, the reaction between the hydrogen sulfide and the sulfur goes nearly to completion as explained above and because the reaction is carried out at the lower temperature, the sulfur is deposited on the catalyst in the second reactor. When the amount of sulfur deposited on the catalyst has become sufficient to interfere with the effective action of the catalyst, the hot gas is introduced into the second reactor running thence to the condenser and thence to the first reactor. The temperatures maintained in this reversed use of the reactors are the same as in the other operations just described.

When the switching over is made, the reactor, which becomes the low temperature reactor, may be at a relatively high temperature. The entering gas will cool it down to the desired temperature. Under certain conditions of operation, the second condenser 329 may thus be necessary. Under certain conditions of operation, it may, however, be omitted.

In the apparatus illustrated in Fig. 4, the invention is carried out with a moving bed of catalyst. The sized catalyst moves by gravity through a reaction zone, and thence to a regeneration zone. The catalyst is then moved from the regeneration zone back to the reaction zone.

In this embodiment a vertical reactor 401 is located above a regenerator 402. These are connected by a gate or valve 475 which controls the rate of flow of the catalyst from the reactor to the regenerator.

A burner 403 has an inlet conduit 404 for the sulfur which is burned to produce sulfur dioxide through the medium of air introduced through a conduit 405 under pressure from a blower 406. A waste heat boiler 407 cools the burner gas somewhat as it passes from the burner to the conduit 408 which opens into the regenerator. A conduit 417 leads from the upper end of the regenerator to a sulfur condenser 420. A conduit 421 leads from condenser 420 to the lower end of reactor 401. A conduit 436 leads from the upper end of the reactor to a stack.

The catalyst moves downwardly through the reactor and then to the regenerator through a conduit 476. It leaves the regenerator through conduit 477 and moves through a catalyst cooler 478 which is located in the conduit 405 so that the air which is fed to the burner is utilized to cool the catalyst and is preheated before passing to the burner. A bleeder valve 499 is provided in conduit 405 in case all of the air used to cool the catalyst is not desired for burning the sulfur.

A conduit 479 carries the regenerated catalyst back to the reactor. It may be provided with any suitable elevating means for lifting the catalyst.

Hydrogen sulfide is introduced at 428.

In operation, the sulfur is burned to produce sulfur dioxide. The hot sulfur dioxide, at a temperature above the dew point of sulfur passes through conduit 408 to the regenerator. The hot gas removes sulfur carried by the catalyst moving through the regenerator and the gas carrying the vaporized sulfur passes through conduit 417 to the sulfur condenser 420 where the sulfur is removed. The hydrogen sulfide mixed with the sulfur dioxide in the condenser passes through conduit 421 to the reactor. The reactor is full of catalyst, either fresh or regenerated, and the sulfur dioxide and hydrogen sulfide react to produce sulfur. The temperature in the reactor is maintained below the dew point of sulfur, preferably below 150° C., so that the reaction proceeds substantially to completion and the waste gases are then led to the stack through conduit 436.

The sulfur formed is deposited on the finely-divided sized catalyst in the reactor and the catalyst, as the sulfur is deposited on it, moves through valve 475 to the regenerator where it is regenerated by the removal of the sulfur by the hot gases from the burner. The catalyst is then cooled and is then carried through conduit 479 to the reactor. The catalyst may flow in a steady stream or it may be moved intermittently.

In the apparatus illustrated in Fig. 5, the catalyst is fluidized with the gases and flows in a continuous cycle from reactor to regenerator to cooler and thence back to the reactor.

The apparatus shown in Fig. 5 is arranged for the use of fluidized catalyst and continuous cyclic operation. There are provided a reactor 501, a regenerator 502, and a catalyst cooler 578, all of the same general construction. Stacks 580, 581 and 582 are provided for and extend, respectively, up to the lower portion of the reactor, the regenerator and the catalyst cooler. Conduit 576 connects the bottom of the reactor 501 with the bottom of the regenerator stack 581. Conduit 577 connects the bottom of the regenerator with the bottom of stack 582. Conduit 579 connects the bottom of the catalyst cooler with the bottom of stack 580.

A burner 503 has a sulfur inlet 504 and an inlet 505 for air provided by a blower 506 which maintains the movement of the air and gases throughout the entire system. A waste heat boiler 507 receives and partially cools gases passing from the burner, and a conduit 508 extends therefrom to the bottom of the stack 581. A conduit 513 extends from the upper end of the regenerator to the sulfur condenser 520. A conduit 521 extends from the sulfur condenser to the bottom of the stack 580. A conduit 536 extends from the upper end of the reactor to a second sulfur condenser 529 from whence the residual, waste gas passes to the stack. A conduit 590 extends from the blower to the bottom of the catalyst cooler stack, and a conduit 591 extends from the upper end of the catalyst cooler back to the burner. Conduit 591 is provided with a bleeder 599.

In the preferred form of the apparatus, the conduits 576, 577, and 579 have sufficient drop so that gravity will feed the catalyst therethrough.

In operation of the apparatus, sized finely-divided catalyst is placed in the reactor, regenerator, catalyst cooler and the connections and stacks 576, 577, 579, 580, 581 and 582 to form a closed catalyst circuit. The catalyst may be from 20 to 40 mesh and is preferably from 100 to 200 mesh. The sulfur and air supplied from the blower are burned in the burner 503 and passed to the regenerator through conduit 508 into which hydrogen sulfide is introduced through conduit 528. The gases are at a temperature above the dew point of sulfur and hence will remove any sulfur which may be on the catalyst in the regenerator. The gases then pass through conduit 513 to the sulfur condenser 520 and there sulfur picked up or created by reaction in the regenerator is removed. The gases then pass through conduit 521 to the bottom of stack 580 and thence to the reactor 501. Gas from the reactor passes through conduit 536 to a second sulfur condenser 529 and thence to the stack.

In the reactor 501, the temperature is maintained below the dew point of sulfur and preferably at 150° C. or below. The reaction is substantially complete and the sulfur is deposited on the catalyst. The blower supplies cool air through the conduit 590 to bottom of stack 582 and from there to the catalyst cooler 578. The heated air then passes through conduit 591 back to the burner 503, the excess being relieved through the bleeder valve 599.

The gas and air supplied to the system are kept in motion by the blower 506. The gas moves from 2 to 20 feet per second, preferably from 5 to 10 feet per second. The rate of flow is thus such that the catalyst is maintained in a fluidized turbulent highly agitated mass resembling boiling liquid. This mass would have a density of 5 to 12 pounds per cubic foot and will flow much as any fluid will flow. The catalyst in the stack 580 is maintained in its fluidized state by the gas introduced from conduit 521 and under influence of the head supplied from the catalyst cooler, flows up through the stack into the reactor where it is agitated and finally finds its way to the conduit 576. The catalyst in the stack 581 is fluidized by the mixture of sulfur dioxide and hydrogen sulfide introduced at the bottom of stack 581 through conduit 508. The catalyst flows up into the regenerator under influence of the head from the reactor, and the force of the entering gas. In the regenerator the catalyst is agitated and flows eventually through the conduit 577 to stack 582. It is fluidized in the stack 582 by the air entering the bottom of the stack through the conduit 590. Under influence of the head from the regenerator, the catalyst rises in the stack 582 and when cooled it flows through conduit 579 back to the bottom of the reactor stack 580. The catalyst thus makes a continuous circuit. First it catalyzes the reaction in the reactor and receives the sulfur deposit, then it has the sulfur removed in the regenerator, and then it is cooled in the catalyst cooler.

Dust collectors may be employed with the various units to prevent the loss of fine catalyst. It may be necessary to provide additional gas or air at various points in the circuit to maintain the catalyst in a fluidized state and to assist in its movement.

From what has been said it will be evident that a major feature of the invention resides in effecting the reaction $$2H_2S + SO_2 = 3S + 2H_2O$$

at a temperature below the dew point of sulfur, with deposition on the catalyst of the sulfur produced. I have found that in this way the conversion is complete, or substantially so. On the other hand, the yield is reduced materially by operation above the dew point, and progressively so as the temperature is increased. The critical factor of this phase of the process is operation below the dew point. Preferably, as indicated above, the reaction is effected below 150° C. There appears to be no lower limit that is reasonably and commercially feasible. Thus, the method has been operated successfully with liquid $H_2S$ and liquid $SO_2$ but as this requires cooling media to keep the reactants liquid it is less desirable than the embodiments described above.

Although stoichiometric proportions according to the foregoing equation are preferred, they are not critical and other proportions may be used if economic factors permit.

The invention is particularly applicable to the treatment of sour natural gas to recover sulfur from its hydrogen sulfide content. However, it is equally applicable to pure, or high purity, $H_2S$, e. g., obtained by scrubbing natural gas, and to refinery gases. However, where sulfur of optimum color and odor is desired the $H_2S$ should be free from unsaturated hydrocarbons.

For ready recovery of sulfur from the condensers they should be at least the melting point of rhombic sulfur, say about 113° C., but a temperature of about 120° C. will insure safe operation since all of the deposited sulfur will not necessarily be the rhombic modification.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A continuous cyclic process for producing sulfur comprising continuously moving a dense suspension of powdered catalyst in a mixture of sulfur dioxide and hydrogen sulfide through a reaction zone at substantially atmospheric pressure and at a temperature below the dew point of the sulfur there produced and thereby reacting the hydrogen sulfide and sulfur dioxide to produce and deposit sulfur on the catalyst, then passing the catalyst to a regenerating chamber and maintaining it therein as a dense suspension while passing sulfur dioxide into contact with it at a sulfur volatilizing temperature and thereby removing the deposited sulfur from the catalyst and regenerating the catalyst, condensing and recovering the sulfur from the resultant mixture of sulfur dioxide and sulfur vapor, returning the thus regenerated catalyst to said reaction zone, and cycling the sulfur dioxide separated from the sulfur to said reaction zone.

2. A process according to claim 1, said reaction zone being at a temperature not above about 150° C.

3. A process according to claim 1, said catalyst being powdered alumina.

References Cited in the file of this patent

UNITED STATES PATENTS

| 1,473,723 | Fogh | Nov. 13, 1923 |
| 1,773,293 | Benner | Aug. 19, 1930 |

(Other references on following page)

UNITED STATES PATENTS

| | | |
|---|---|---|
| 1,773,294 | Benner | Aug. 19, 1930 |
| 1,905,901 | Clark | April 25, 1933 |
| 1,917,689 | Baum | July 11, 1933 |
| 1,922,872 | Thompson | Aug. 15, 1933 |
| 1,984,380 | Odell | Dec. 18, 1934 |
| 2,148,258 | Carter | Feb. 21, 1939 |
| 2,153,337 | Oliver | Apr. 4, 1939 |
| 2,200,928 | Lindblad | May 14, 1940 |
| 2,384,926 | Jones | Sept. 18, 1945 |
| 2,389,810 | Odell et al. | Nov. 27, 1945 |
| 2,551,905 | Robinson | May 8, 1951 |
| 2,561,990 | Miller | July 24, 1951 |

FOREIGN PATENTS

| | | |
|---|---|---|
| 935,357 | France | Feb. 2, 1948 |
| 280,947 | Great Britain | Feb. 18, 1929 |